United States Patent [19]
Wittenbrink et al.

[11] Patent Number: 6,103,773
[45] Date of Patent: Aug. 15, 2000

[54] GAS CONVERSION USING HYDROGEN PRODUCED FROM SYNGAS FOR REMOVING SULFUR FROM GAS WELL HYDROCARBON LIQUIDS

[75] Inventors: Robert J. Wittenbrink, Baton Rouge, La.; Charles W. DeGeorge, Chester, N.J.

[73] Assignee: Exxon Research and Engineering Co, Florham Park, N.J.

[21] Appl. No.: 09/014,175

[22] Filed: Feb. 27, 1998

[51] Int. Cl.[7] .................................................. C07C 1/04
[52] U.S. Cl. .......................... 518/702; 518/709; 518/715; 518/726; 208/137; 208/209; 208/950; 48/127.3; 48/127.5; 48/127.7; 48/198.1; 48/198.3
[58] Field of Search ................... 48/198.1, 198.3, 48/127.1, 127.3, 127.5, 127.7; 208/137, 950, 209; 518/702, 709, 715, 726; 252/373; 423/651

[56] References Cited

U.S. PATENT DOCUMENTS

| | | | |
|---|---|---|---|
| 2,657,175 | 10/1953 | Mason | 208/209 |
| 3,890,113 | 6/1975 | Child et al. | 48/197 R |
| 4,049,741 | 9/1977 | Kuo et al. | 260/676 R |
| 4,595,703 | 6/1986 | Payne et al. | 518/715 |
| 4,713,090 | 12/1987 | Yokoe et al. | 55/68 |
| 4,919,786 | 4/1990 | Hamner et al. | 208/27 |
| 5,260,239 | 11/1993 | Hsia | 502/30 |
| 5,292,705 | 3/1994 | Mitchell | 502/325 |
| 5,378,348 | 1/1995 | Davis et al. | 208/27 |
| 5,763,716 | 6/1998 | Benham et al. | 585/315 |
| 5,766,274 | 6/1998 | Wittenbrink et al. | 44/436 |
| 5,769,909 | 6/1998 | Bonk et al. | 48/127.9 |
| 5,821,270 | 10/1998 | Chang et al. | 518/700 |

FOREIGN PATENT DOCUMENTS

| | | | |
|---|---|---|---|
| 0269297A1 | 6/1988 | European Pat. Off. | C07C 15/00 |
| 0512635A2 | 11/1992 | European Pat. Off. | C07C 1/08 |

OTHER PUBLICATIONS

Rostrup–Nielson, Syngas for $C_1$–Chemistry. Limits of the steam reforming process, p. 73–78, (Elsevier, 1988) Stud. Surf. Sci. Catal. vol. 36.

Primary Examiner—Gary P. Straub
Assistant Examiner—Timothy C Vanoy
Attorney, Agent, or Firm—Jay Simon

[57] ABSTRACT

A gas conversion process comprising synthesis gas production, hydrocarbon synthesis and hydrogen production from the synthesis gas, also includes hydrodesulfurizing sulfur-containing hydrocarbon liquids separated from a mixture of natural gas and the liquids produced from a gas well. Hydrogen produced from the synthesis gas is used for the hydrodesulfurization, to remove at least a portion of the sulfur as $H_2S$ and form desulfurized hydrocarbon liquid. The hydrogen is produced from the synthesis gas by one or more of (i) physical separation means such as pressure swing adsorption and (ii) chemical means such as a water gas shift reactor. The synthesized hydrocarbons are upgraded by hydroconversion. A portion of the hydrogen produced from the synthesis gas may also be used for at least one of (i) hydrocarbon synthesis catalyst rejuvenation and the hydroconversion.

21 Claims, 2 Drawing Sheets

GAS CONVERSION USING HYDROGEN PRODUCED FROM SYNGAS FOR REMOVING SULFUR FROM GAS WELL HYDROCARBON LIQUIDS

BACKGROUND OF THE DISCLOSURE

1. Field of the Invention

The invention relates to a gas conversion process in which hydrogen produced from the syngas is used to treat gas well hydrocarbon liquids. More particularly, the invention relates to a process for synthesizing hydrocarbons and producing hydrogen from a syngas feed which is derived from natural gas, with at least a portion of the hydrogen used for hydrodesulfurizing sulfur-containing hydrocarbon liquids recovered from the natural gas.

2. Background of the Invention

Gas conversion processes are known in which a synthesis gas feed comprising a mixture of $H_2$ and CO is fed into a hydrocarbon synthesis reactor in which it reacts in the presence of a Fischer-Tropsch catalyst under conditions effective to form higher molecular weight hydrocarbons. These processes include fixed bed, fluid bed and slurry hydrocarbon synthesis, all of which are well documented in various technical articles and in patents. In many cases it is desired that the synthesized hydrocarbons comprise mostly $C_{5+}$ hydrocarbons (e.g., $C_{5+}$–$C_{200}$) and preferably $C_{10+}$ hydrocarbons, at least a portion of which are solid at standard conditions of room temperature and pressure. It is preferred in a slurry hydrocarbon synthesis process that the hydrocarbons comprise mostly $C_{5+}$ paraffins. These hydrocarbons are upgraded to more valuable products by one or more hydroconversion operations in which at least a portion of the molecular structure is changed by reacting with hydrogen. Hydrogen is also required for rejuvenating the hydrocarbon synthesis catalyst and sometimes for maintaining or changing the $H_2$ to CO ratio of the synthesis gas feed for the hydrocarbon synthesis. Natural gas comprises primarily methane and is a preferred feed for the synthesis gas generation. In addition to methane, natural gas also contains lessor amounts of valuable, sulfur-containing $C_{2+}$ hydrocarbons (e.g., 1–10%), including sulfur-containing hydrocarbon liquids which are separated and recovered from the gas. These hydrocarbon liquids are reacted with hydrogen in the presence of a catalyst to remove the sulfur (hydrodesulfurized).

SUMMARY OF THE INVENTION

The invention relates to a gas conversion process for producing both hydrocarbons and hydrogen from a synthesis gas (syngas) comprising a mixture of $H_2$ and CO produced from a natural gas feed from which sulfur-containing, hydrocarbon liquids (typically $C_{4+}$) are recovered as well condensate, with at least a portion of the hydrogen used for removing the sulfur from the condensate. Sulfur is removed from the condensate by reacting it with the hydrogen in the presence of a suitable hydrodesulfurization catalyst at conditions effective for removing the sulfur (hereinafter "hydrodesulfurizing"). Some of the hydrogen produced from the syngas may also be used for other purposes associated with the overall gas conversion process. More specifically, the invention comprises a gas conversion process which includes separating sulfur-containing hydrocarbon liquids from natural gas comprising a mixture of hydrocarbon gas and said liquids, forming a synthesis gas comprising a mixture of $H_2$ and CO from said hydrocarbon gas, synthesizing hydrocarbons by contacting a portion of said synthesis gas with a hydrocarbon synthesis catalyst and reacting said $H_2$ and CO in the presence of said catalyst at conditions effective to form hydrocarbons, producing hydrogen from another portion of said synthesis gas and reacting said hydrogen with said sulfur-containing liquids in the presence of a hydrodesulfurization catalyst at conditions effective to remove said sulfur. Suitable hydrodesulfurization catalysts are well known and include, for example, a mixture of cobalt and molybdenum oxides supported on alumina. The sulfur containing hydrocarbon liquids are produced from a natural gas well, along with the natural gas, as is known. In a preferred embodiment at least a portion of the synthesized hydrocarbons are upgraded by one or more conversion operations in which a portion of the molecular structure is changed, and preferably one or more hydroconversion operations in which the molecular structure is changed by reacting the hydrocarbons with hydrogen in the presence of a suitable hydroconversion catalyst. Hereinafter, hydrocarbon synthesis will be referred to as "HCS".

The synthesis gas or syngas is produced from the natural gas using any suitable syngas generating means, including catalytic and non-catalytic partial oxidation, steam reforming and combinations of partial oxidation and catalytic steam reforming, using either a fluid or fixed bed of catalyst. As is known, such means include fluid bed syngas generation (FBSG), autothermal reforming, and the like, in which the hydrocarbon component of the gas, which is mostly methane, is partially oxidized and steam reformed. The hydrogen is produced from the syngas using one or more of (i) physical separation means such as pressure swing adsorption (PSA), membrane separation or thermal swing adsorption (TSA), and (ii) chemical means such as a water gas shift reaction. Physical means for separating the hydrogen will typically be used to separate the hydrogen from the gas irrespective of whether or not chemical means such as a water gas shift reaction is used, in order to obtain hydrogen of the desired degree of purity (e.g., at least about 80%). If sufficient hydrogen is recovered from the syngas, a portion of it may also be used for at least one of (i) hydrocarbon synthesis, (ii) hydrocarbon synthesis catalyst rejuvenation, and (iii) upgrading at least a portion of the synthesized hydrocarbons by one or more hydroconversion operations.

Producing hydrogen from the syngas using physical separation means provides relatively pure hydrogen, along with an offgas which comprises a hydrogen depleted and CO rich mixture of $H_2$ and CO. This offgas may be used as fuel or fed into the HCS reaction zone. If the demand for hydrogen is greater than can be met by separating hydrogen from the syngas or if an ancillary or alternate means for producing hydrogen is desired, chemical means such as a water gas shift reactor may be used to produce, from the syngas, all or a portion of the hydrogen required. In this embodiment, at least one of (a) a portion of the syngas and (b) the CO rich offgas resulting from physically separating hydrogen from the syngas, are fed into a water gas shift reactor in the presence of steam and a water gas shift catalyst to form a mixture of $H_2$ and $CO_2$ from the CO and steam which is then passed through physical separation means to separate the $H_2$ from the rest of the gas and form relatively pure $H_2$, and a CO rich offgas, with the offgas recycled back into either the HCS reaction zone, into the shift reactor, or used as fuel.

DETAILED DESCRIPTION

Figure 1:
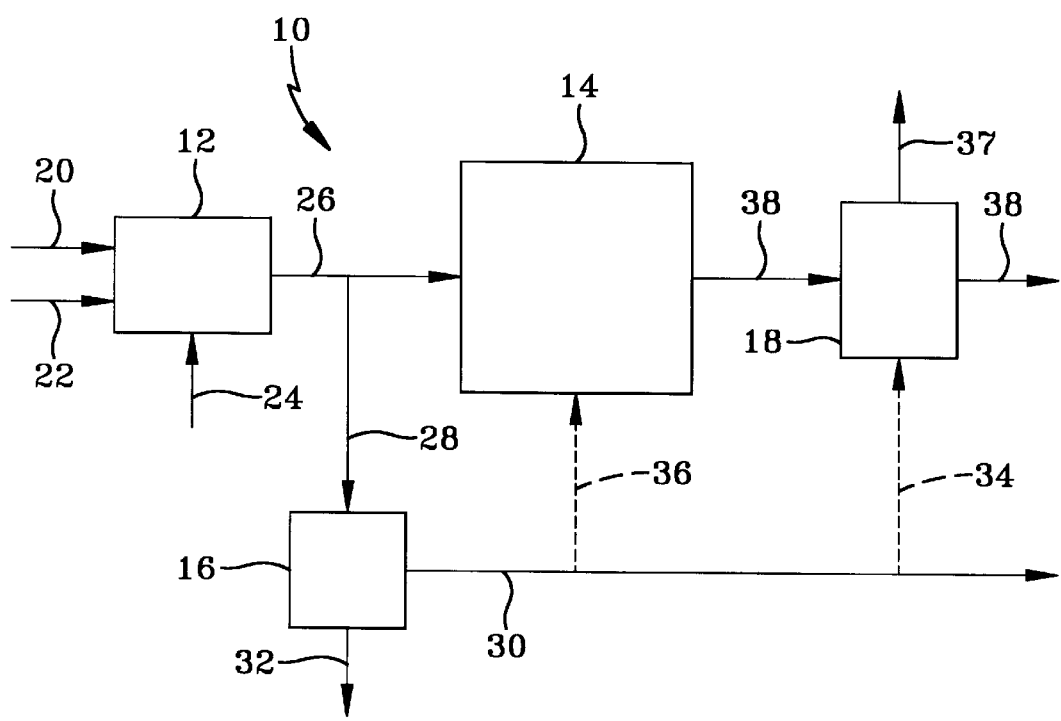
FIG. 1 is a simple block flow diagram illustrating the production of syngas, hydrocarbons syngas hydrogen and hydroconversion, following separation of the liquids from the natural gas.

In the process of the invention, natural gas produced from a natural gas well is processed to recover sulfur-containing hydrocarbon liquids (typically $C_{4+}$) as well condensate. This condensate contains sulfur which must be removed in order to use the liquids for various purposes, including fuels, for blending with other hydrocarbon materials and as raw material for chemicals processes. Separation and recovery of the condensate may be accomplished by various means such as gas-liquid separators, with or without prior cooling of the gas, and fractionation, as is known. While the composition of natural gas may vary widely from one location to another, it generally comprises mostly methane. A typical natural gas useful as a feed for syngas generation comprises, for example, nitrogen in an amount of from about 0–10%, %, about 2–15% $C_{2+}$ primarily paraffinic hydrocarbons (about 2–10% $C_2$–$C_4$), $CO_2$ in an amount of up to about 15% and the remainder methane. The $C_{4+}$ fraction of the $C_{2+}$ typically ranges from between about 0.5 to 5 volume %. Due to the high pressure of the gas at the well head, even $C_4$ hydrocarbons are typically present as liquid and the gas is passed through a gas-liquid separator drum to separate the liquid. The amount of $C_{4+}$ present and the cut point varies with the pressure and temperature. Some of the heavier hydrocarbons are also present in the gas as vapor, and it is common to cool the gas to recover additional $C_{4+}$ hydrocarbons, which are then combined with those recovered from the well. Sulfur compounds, including primarily $H_2S$, along with RSH, COS and other organic sulfur compounds are invariably present in these liquids and in the gas. The gas is therefore also treated to remove the sulfur compounds, and depending on the concentration, also at least some of the $CO_2$ before it is sent to a syngas generator. In the practice of the invention, the hydrocarbon liquid is upgraded by hydrodesulfurizing to remove sulfur. The hydrodesulfurizing is accomplished by contacting the hydrocarbon liquids with hydrogen in the presence of a suitable hydrodesulfurization catalyst, at conditions effective to remove most of the sulfur. The condensed hydrocarbon liquids typically contain nitrogen compounds and some oxygenates. Most of these nitrogen compounds and oxygenates are also removed during the desulfurization. Hydrodesulfurizing hydrocarbons for sulfur removal is well known and any conventional hydrodesulfurizing catalyst can be used, such as, Cyanamid's HDN-30; Katalco's NM-506; Ketjen's KF-840, etc. Such catalysts typically comprise Group VIII non-noble metals such as Ni and Co, and also Group VI metals such as Mo and W, supported on a refractory metal oxide support. The Groups referred to are the Groups in the Periodic Table of the Elements copyrighted by Sargent-Welch Scientific Company in 1968. A typical hydrodesulfurization catalyst comprises a mixture of nickel and molybdenum oxides supported on alumina. While hydrodesulfurizing conditions vary and may include a space velocity of from about 0.5–10 v/v/hr, from 200–350 psig hydrogen pressure and a gas treat rate of from about 300–1,000 SCF $H_2$/B, typical desulfurizing conditions in the practice of the invention include a space velocity of about 1 v/v/hr, 250 psig hydrogen and 600 SCF $H_2$/B. As mentioned above, these hydrodesulfurization catalysts and conditions will also remove any oxygenates and most of the nitrogen compounds from the liquid. After sulfur and, if necessary, $CO_2$ removal, the natural gas is fed into a syngas generator in which the hydrocarbon component of the gas is reacted in a syngas generator to form the syngas comprising a mixture of $H_2$ and CO in the desired mole ratio. In a syngas generator, the hydrocarbon gas is partially oxidized with oxygen or air, steam reformed, or partially oxidized and either steam reformed or passed into a water gas shift reactor. Steam reforming is accomplished with the steam reforming catalyst in either a fixed or fluid bed, with a fluid bed having superior mixing and heat transfer characteristics. In catalytic partial oxidation, the treated natural gas comprising mostly low molecular weight alkane gas, as in methane, is premixed with oxygen, and optionally steam, and passed into the syngas generator in which it reacts in the presence of a noble metal catalyst and preferably a supported noble metal catalyst to form the syngas, as is known. Processes that combine partial oxidation and steam reforming may have the steam reforming catalyst in either a fixed or fluid bed, with a fluid bed having superior mixing and heat transfer characteristics. In a fluid bed syngas generating (FBSG) process, the partial oxidation and steam reforming both occur in the presence of the fluidized steam reforming catalyst. FBSG is disclosed, for example, in U.S. Pat. Nos. 4,888,131 and 5,160,456. In autothermal reforming, partial oxidation occurs in the absence of a catalyst and precedes adiabatic steam reforming which occurs in a fixed bed of catalyst. The syngas exiting the reactor comprises a mixture of $H_2$ and CO along with water vapor or steam, nitrogen, $CO_2$ and minor amounts of unreacted methane. The amount of $CO_2$ present in the feed to the syngas generator will effect the reaction equilibrium and may be used, along with the conditions in the unit, to adjust the $H_2$ to CO ratio of the syngas. Most of the water is removed from the syngas before it is passed into an HCS reactor. Irrespective of either the source of the hydrocarbon for the syngas production or the process, such hydrocarbon feeds invariably contain elemental nitrogen or nitrogen containing compounds which react in the syngas generator to form nitrogenous species, such as HCN and $NH_3$, which deactivate the HCS catalyst during the HCS reaction. The catalyst activity is restored (rejuvenated) by contacting the deactivated HCS catalyst with a gas comprising hydrogen, as is known.

In an HCS process, liquid and gaseous hydrocarbon products are formed by contacting a syngas comprising a mixture of $H_2$ and CO with a Fischer-Tropsch type of HCS catalyst, under shifting or non-shifting conditions and preferably under non-shifting conditions in which little or no water gas shift reaction occurs, particularly when the catalytic metal comprises Co, Ru or mixture thereof. Suitable Fischer-Tropsch reaction types of catalyst comprise, for example, one or more Group VIII catalytic metals such as Fe, Ni, Co, Ru and Re. In one embodiment the catalyst comprises catalytically effective amounts of Co and one or more of Re, Ru, Fe, Ni, Th, Zr, Hf, U, Mg and La on a suitable inorganic support material, preferably one which comprises one or more refractory metal oxides. Preferred supports for Co containing catalysts comprise titania, particularly when employing a slurry HCS process in which higher molecular weight, primarily paraffinic liquid hydrocarbon products are desired. Useful catalysts and their preparation are known and illustrative, but nonlimiting examples may be found, for example, in U.S. Pat. Nos. 4,568,663; 4,663,305; 4,542,122; 4,621,072 and 5,545,674.

With respect to the hydrocarbon synthesis, fixed bed, fluid bed and slurry hydrocarbon synthesis (HCS) processes for forming hydrocarbons from a syngas comprising a mixture of H$_2$ and CO are well known and documented in the literature. In all of these processes the syngas is reacted in the presence of a suitable Fischer-Tropsch type of hydrocarbon synthesis catalyst, at reaction conditions effective to form hydrocarbons. Some of these hydrocarbons will be liquid, some solid (e.g., wax) and some gas at standard conditions of temperature and pressure of 25° C. and one atmosphere,, particularly if a catalyst having a catalytic cobalt component is used. Slurry HCS processes are often preferred because of their superior heat (and mass) transfer characteristics for the strongly exothermic synthesis reaction and because they are able to produce relatively high molecular weight, paraffinic hydrocarbons when using a cobalt catalyst. In a slurry HCS process a syngas comprising a mixture of H$_2$ and CO is bubbled up as a third phase through a slurry in a reactor which comprises a particulate Fischer-Tropsch type hydrocarbon synthesis catalyst dispersed and suspended in a slurry liquid comprising hydrocarbon products of the synthesis reaction which are liquid at the reaction conditions. The mole ratio of the hydrogen to the carbon monoxide may broadly range from about 0.5 to 4, but is more typically within the range of from about 0.7 to 2.75 and preferably from about 0.7 to 2.5. The stoichiometric mole ratio for a Fischer-Tropsch HCS reaction is 2.0, but in the practice of the present invention it may be increased to obtain the amount of hydrogen desired from the syngas for other than the HCS reaction. In a slurry HCS process the mole ratio of the H$_2$ to CO is typically about 2.1/1. Slurry HCS process conditions vary somewhat depending on the catalyst and desired products. Typical conditions effective to form hydrocarbons comprising mostly C$_{5+}$ paraffins, (e.g., C$_{5+}$–C$_{200}$) and preferably C$_{10+}$ paraffins, in a slurry HCS process employing a catalyst comprising a supported cobalt component include, for example, temperatures, pressures and hourly gas space velocities in the range of from about 320–600° F., 80–600 psi and 100–40,000 V/hr/V, expressed as standard volumes of the gaseous CO and H$_2$ mixture (0° C., 1 atm) per hour per volume of catalyst, respectively. During the hydrocarbon synthesis operation, the HCS catalyst loses activity (deactivates) by deactivating species mentioned above present in the syngas and resulting from the synthesis reaction. This deactivation is reversible and catalytic activity is restored (the catalyst rejuvenated) by contacting the deactivated catalyst with hydrogen. The activity of the HCS catalyst in the reactive slurry is intermittently or continuously rejuvenated by contacting the slurry with hydrogen or a hydrogen containing gas to form a catalyst rejuvenated slurry either in-situ in the HCS reactor or in an external rejuvenation vessel, as is disclosed, for example, in U.S. Pat. Nos. 5,260,239; 5,268,344, and 5,283,216.

Physical separation processes useful for producing hydrogen from the syngas include adsorption-desorption processes and membrane separation, both of which are well known and commercially available. Adsorption-desorption processes include TSA and PSA, both of which comprise a plurality of adsorbent containing vessels operated in a cyclic manner. Adsorbents include molecular sieves, silica gel and activated carbon. The difference between pressure swing adsorption and thermal swing adsorption, is that the gas constituents other than hydrogen which are primarily adsorbed by the adsorbent during the adsorption part of the cycle are desorbed from the adsorbent during regeneration by a pressure swing cycle in PSA, as opposed to a thermal swing cycle in thermal swing adsorption. The pressure differential between adsorption and desorption is typically on the order of at least a magnitude. During operation, the feed gas, which in this case is a slip stream of the syngas, is fed into one or more vessels or adsorption zones in which the syngas components other than hydrogen (along with a minor amount of hydrogen) are adsorbed by the adsorbent. When the adsorbent has achieved capacity, the feed flow into the vessel is shut off, the pressure reduced and the adsorbed non-hydrogen components of the syngas are desorbed and removed as a purge gas. If desired, some hydrogen can be used to sweep the vessel at the end of the desorption cycle. The vessel is repressurized and placed back on stream for the next adsorption cycle. Thus, the purge gas contains the CO and any other non-hydrogen syngas components, along with a minor amount of hydrogen. This purge gas is the adsorption offgas which may be sent to disposal or burned as fuel, but which is preferably recycled back into one or more HCS reactors as part of the feed to utilize the valuable CO for the hydrocarbon synthesis. The hydrogen separated from the syngas during the adsorption is typically 99% pure and even purer than 99%. A typical PSA unit has at least one vessel on adsorption, while at least one other vessel is being depressurized and purged, with yet at least one other vessel being repressurized. In membrane adsorption, bundles of hollow fibers are present in the vessel and the syngas is passed into the vessel in which it flows over the outside of the fibers and out of the vessel. A hydrogen rich permeate gas forms inside each fiber and is removed as a separate, permeate stream. In a typical installation a plurality of such vessels are connected in series, with the permeate from each vessel being the feed into the next successive vessel. High capacity is achieved by using parallel sets of series units. The hydrogen is typically not as pure as that achieved with PSA, but is generally at least about 80% pure. The non-permeate effluents are combined as a CO rich offgas which is utilized in the same manner as for that recovered from the PSA separation. Yet another embodiment of physical separation comprises a combination of PSA or TSA adsorption-desorption and membrane separation. In a typical separation process of this type, the syngas is first passed through a membrane unit to produce a hydrogen-rich gas stream as the permeate. This hydrogen-rich permeate is then passed through a PSA or TSA unit to produce the high purity hydrogen stream and a CO-rich offgas stream. With this process, the amount of offgas produced is less than that obtained using either method by itself.

When using a water gas shift reaction to produce hydrogen, a portion or slip stream of syngas is passed into a water gas shift reactor in which the CO reacts with water vapor in the presence of a shift catalyst, such as nickel on a refractory support, at reaction conditions effective to form a mixture of H$_2$ and CO$_2$ which exits the shift reactor along with the other syngas components, including unreacted CO. If desired, the CO$_2$ may be removed from the shift reactor effluent by means well known to those skilled in the art, such as amine scrubbing. A commercially available process which employs hindered amine scrubbing for CO$_2$ removal is Exxon's FLEXSO RB® process. The hydrogen rich shift reactor effluent, with or without CO$_2$ removal and, after cooling and drum separation for removal of any excess water, is passed through physical separation means for separating the hydrogen from the CO and other non-hydrogen components present in the gas, to form a relatively pure stream of hydrogen and a CO containing offgas. These gas streams are then utilized in the same manner as above, but with the CO containing offgas typically burned as fuel due to the lower CO content of the offgas. Whether or not a shift reactor is employed depends on the amount of hydrogen desired and the capacity of the syngas generator to satisfy the syngas requirements for both the hydrocarbon synthesis and the hydrogen production.

Referring to FIG. 1, an integrated gas conversion plant 10 comprises an FBSG syngas generating unit 12, a slurry HCS reactor 14, a means 16 for producing hydrogen from a portion of the syngas, and a hydroconversion unit 18. Natural gas, oxygen and steam are fed into the FBSG unit via lines 20, 22 and 24, respectively to generate syngas comprising a mixture of $H_2$ and CO. Based on 100 moles per hour of CO entering the slurry HCS reactor 14, the syngas stream passed from the syngas generator 12 into line 26 comprises 218 moles per hour of hydrogen and 105 moles per hour of CO, with an $H_2$ to CO mole ratio of about 2.1:1. A commercial scale plant will be much larger, processing as much as 100,000 or more moles per hour of CO. Hereinafter, all numbers will refer to moles per hour unless otherwise indicated. Of this, 209 moles of hydrogen and 100 of CO are passed into the HCS reactor 14 via line 26. The HCS reactor contains a catalyst comprising a supported catalytic cobalt component and is designed to operate at 80% conversion of the CO. A syngas slip stream containing 9 moles of hydrogen and 4 of CO is withdrawn from line 26, via line 28, and passed into the hydrogen producing unit 16. In the embodiment in which a PSA unit is used, typically a stream of at least 99% hydrogen is produced, with the remainder being low molecular weight hydrocarbons and nitrogen. For the purposes of this example, 85% of the hydrogen is separated from the slip stream using molecular sieves for the adsorption separation. Eight moles of hydrogen are passed into line 30, with the $H_2$ depleted and CO rich offgas produced by the hydrogen separation withdrawn via line 32 comprising 1 mole of hydrogen and 4 moles of CO. In this embodiment, the offgas is then used as a low BTU value fuel gas. At least a portion of the hydrogen withdrawn from the PSA unit is passed, via line 30, into a hydrodesulfurization reactor 54 (shown in FIG. 2) for removing the sulfur from the sulfur-containing hydrocarbon liquids recovered from the natural gas. If sufficient hydrogen is left over, another portion may be removed from line 30 (a) via line 34, and passed into a hydroconversion unit 18 and/or (b) hydrogen for HCS catalyst rejuvenation removed from 30, via line 36, and passed into a catalyst rejuvenating zone (not shown). The HCS catalyst may be rejuvenated inside of the HCS reactor or in a separate rejuvenation vessel external of the HCS reactor, or both, as is known. The hydrocarbons produced in the HCS reactor are removed via line 38 and passed into a hydroconversion unit 18 in which they are fed, along with hydrogen, into a hydroisomerization reactor to produce lower boiling material and in which the heavy, 700° F.+ hydrocarbons are converted into 700° F.– hydrocarbons. The hydrocarbons are hydroisomerized by reacting with $H_2$ in the presence of a suitable hydroisomerization catalyst, such as a cobalt-molybdenum catalyst on a silica-alumina support, at a 700° F.+ fraction conversion of 50 wt. %. This means that with each pass through the reactor, 50 wt. % of the 700° F.+ material is converted into 700° F.– material having a boiling point of less than 700° F. The hydroisomerized, 700° F.– material is then processed into fuel or used as a more transportable material for further upgrading operations. Any unconverted 700° F.+ material is recycled and mixed with the fresh feed to the hydroisomerization reactor. Alternately, the pour point and viscosity of the synthesized liquids withdrawn from the HCS reactor may be reduced via hydroisomerization to make a syncrude or more pumpable and transportable material. Hydroisomerization of HCS hydrocarbon product is known and illustrative, but nonlimiting examples of catalysts, reaction conditions and processes may be found, for example, in U.S. Pat. Nos. 4,832,819; 4,943,672; 5,059,299; 5,378,348 and 5,457,253. Such processes include, for example, hydroisomerization, hydrocracking, hydrodewaxing, hydrorefining and the more severe hydrorefining referred to as hydrotreating, all conducted at conditions well known in the literature for hydroconversion of hydrocarbon feeds, including hydrocarbon feeds rich in paraffins. Illustrative, but nonlimiting examples of more valuable products formed by conversion include one or more of a synthetic crude oil, liquid fuel, olefins, solvents, lubricating, industrial or medicinal oil, waxy hydrocarbons, nitrogen and oxygen containing compounds, and the like. Liquid fuel includes one or more of motor gasoline, diesel fuel, jet fuel, and kerosene, while lubricating oil includes, for example, automotive, jet, turbine and metal working oils. Industrial oil includes well drilling fluids, agricultural oils, heat transfer fluids and the like.

Figure 2:
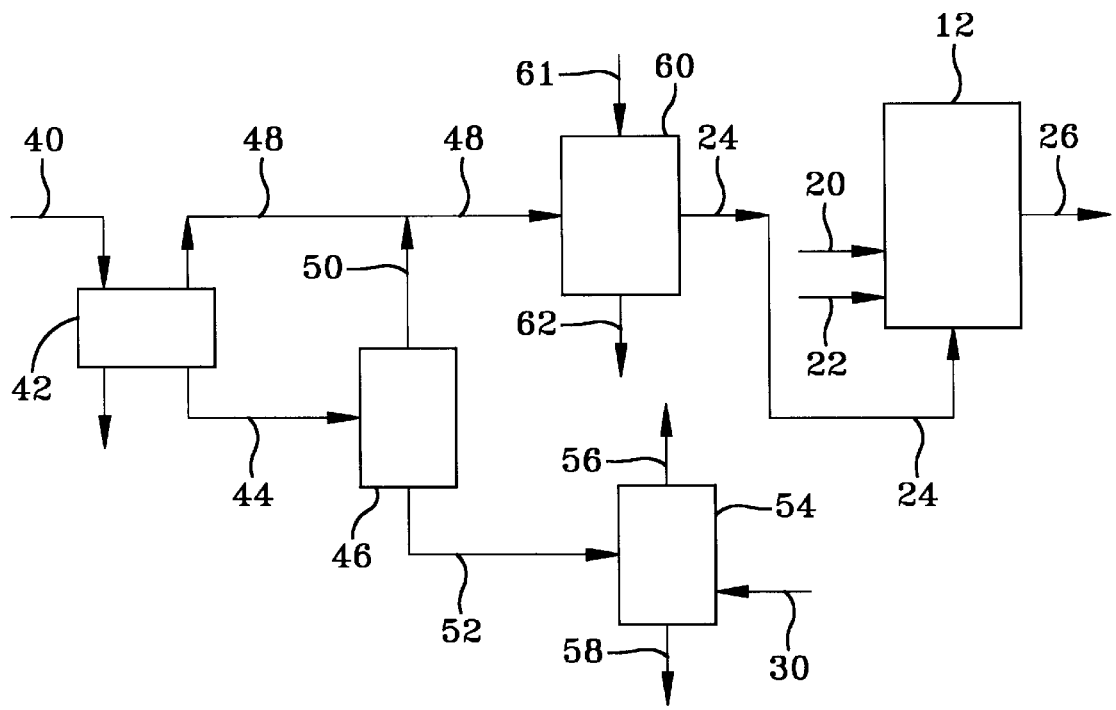
FIG. 2 is a schematic block diagram illustrating details of the recovery and desulfurization of the sulfur-containing liquids from the natural gas.

FIG. 2 illustrates details of the recovery and hydrodesulfurization of the sulfur-containing hydrocarbon liquids recovered from the natural gas, in which hydrogen produced in unit 16 is used for the hydrodesulfurization, and with the natural gas further processed to remove sulfur and then used as feed for the syngas generator. Referring to FIG. 2, a mixture of natural gas and sulfur-containing hydrocarbon liquids removed from a gas well (not shown) is passed, via line 40 into a gas-liquid separation vessel 42, with the separated hydrocarbon liquids passed, via line 44, into a fractionator 46 which is at a lower pressure (e.g., a pressure of from about 50–300 psig) than that in 42. This removes more gas from the liquid condensate, with the gas then passed, via line 50 into line 48 where it is combined with the gas removed from the separation vessel. The gas-reduced condensate is then removed from the fractionator and passed into hydrodesulfurizer 54 via line 52. The hydrodesulfurizer contains a fixed bed of a hydrodesulfurizing catalyst, such as cobalt and molybdenum oxides on an alumina support, as is well known. The hydrogen separated from the synthesis gas in PSA unit 16 is passed into the hydrodesulfurizer via line 30 and reacts with the hydrocarbon liquids in the presence of the catalyst at conditions effective to remove the sulfur. The sulfur is removed as $H_2S$ via line 56 and sent to sulfur disposal. The hydrodesulfurized condensate hydrocarbon liquids are removed from the bottom of the hydrodesulfurizer via line 58. The condensate reduced natural gas is passed, via line 48, into a gas cleaning unit 60 in which sulfur compounds and, if required, $CO_2$ are removed to produce a sweet gas and in which additional hydrocarbon liquids may be recovered from the gas by condensation. The $CO_2$ and sulfur removal is accomplished by any well known means, such as scrubbing with an aqueous solution of a hindered amine and alcohol (e.g., 2-piperidine and ethanol-sulfolane for removing the $H_2S$ and $CO_2$ from the gas, as is disclosed in U.S. Pat. No. 4,112,051) as is used in Exxon's FLEXSORB PS® process. The amine solution enters the gas cleaning unit or scrubber via line 61 and the sulfur laden solution is withdrawn via line 62. The sweet gas is then passed through other units and guard beds if necessary to further reduce the sulfur content and also remove nitrogen compounds, and passed into the FBSG via line 24.

Referring again to FIG. 1, hydroconverted synthesized hydrocarbons are withdrawn from the hydroconversion unit via line 35 and passed to further upgrading or sold neat. A portion of the hydrogen passed into unit 18 remains unused and is withdrawn as tail gas via line 37. In further embodiments (not shown) all or a portion of this tail gas may be used for catalyst rejuvenation, as part of the syngas feed to adjust the $H_2$ to CO ratio, for the condensate hydrodesulfurizing operation, passed back into the hydrogen producing unit to reduce the requirements load on the syngas generator and also to raise the hydrogen purity in the feed stream to the hydrogen recovery unit, or for any other purpose. Similarly, all or a portion of the CO rich PSA offgas produced by the hydrogen separation from the syngas slip stream in the process scheme of FIG. 1 may be passed (not shown) into the HCS reaction zone as part of the syngas feed, instead of being consumed as fuel. In yet another embodiment which is not shown, the slip stream of syngas, along with additional water vapor if necessary, is fed into a water gas shift reactor in which the water reacts with the CO to produce $H_2$ and $CO_2$.

Figure 3:
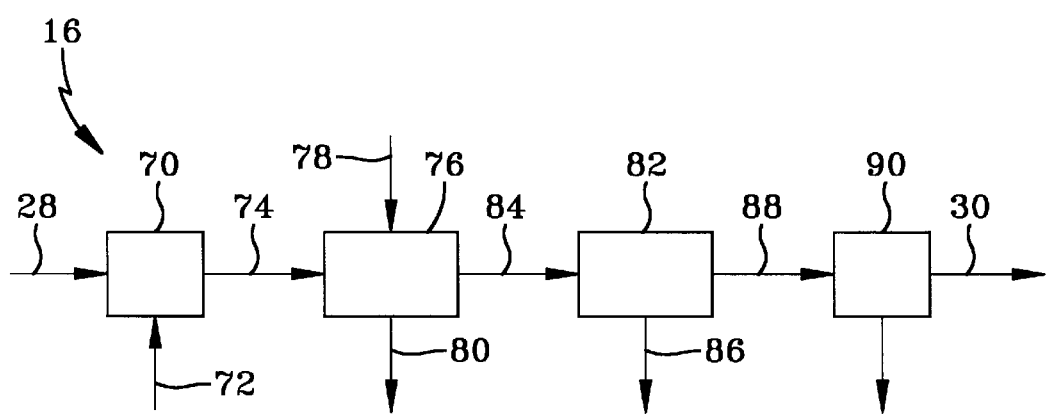
FIG. 3 is a block flow diagram of hydrogen production using a water gas shift reaction.

FIG. 3 is a block flow diagram of hydrogen production from the syngas using a water gas shift reaction followed by PSA separation. Thus, referring to FIG. 3, the hydrogen producing means 16 comprises a water gas shift reactor 70, into which is fed the syngas slip stream via line 28 and, steam via line 72 if the syngas doesn't contain enough water vapor. The shift reactor contains a water gas shift catalyst such as chromium oxide promoted iron oxide. In the shift reactor, the steam reacts with the CO in the presence of the catalyst to form one mole of $H_2$ and one mole of $CO_2$ for each mole of CO and $H_2O$ reacted, to produce a hydrogen rich gas which contains $CO_2$ and any unreacted CO and $H_2O$ which exits the reactor and, after cooling and drum separation for water removal is passed, via line 74, into scrubber 76 for $CO_2$ removal. Scrubber 76 is a conventional contacting tower containing inert packing or fractionation trays. A solvent, such as an aqueous amine solution or an aqueous hindered amine solution such as FLEXSORB PS® containing 2-piperidine and ethanolsulfolane for removing the $CO_2$ from the gas, as is disclosed in U.S. Pat. No. 4,112,051, enters via line 78 and removes the $CO_2$. The particular solvent $CO_2$ removal system or other $CO_2$ removal means depends on the extent of $CO_2$ removal desired. If the Flexsorb PS® system is used, virtually all of the $CO_2$ is removed from the gas. The $CO_2$ laden solution is removed via line 80 and sent to solvent recovery, while the scrubbed vapor reduced in $CO_2$ is passed into heat exchanger and separation unit 82, via line 84, in which it is cooled to below 200° F. and the water removed via line 86. The cool gas which still contains water vapor, but not liquid water, is passed into PSA unit 90 via line 88. The PSA unit separates the hydrogen from the rest of the gas to produce 99% or higher purity hydrogen, which is removed via line 30 and used according to any or all of the embodiments above. The offgas resulting from the hydrogen separation is removed via line 32 and is typically used as a low BTU value fuel. Alternately, the $CO_2$ removed from the system need not be provided, with the purification of the shift effluent accomplished solely through the use of PSA.

While the invention has been described in particular detail for an FBSG syngas generator using processed natural gas as the hydrocarbon feed to the generator, a slurry HCS unit and a hydroisomerization unit for the hydroconversion, the practice of the invention is not limited to these specific embodiments as those skilled in the art will know and appreciate. Thus, any suitable and convenient source of syngas, and syngas generating process may be used, as may either fluid catalyst bed or fixed catalyst bed, non-slurry HCS processes. Similarly, the hydroconversion processes or processes will not be limited to those listed above. Further, the synthesized hydrocarbons may also be upgraded by a conversion process in which at least a portion of the molecular structure of the hydrocarbon is changed without reacting with hydrogen, such as noncatalytic processing (e.g., steam cracking) and catalytic processing (e.g., catalytic cracking) in which hydrogen is not present as a coreactant. The extent and type of sulfur and $CO_2$ removal for the natural gas, the syngas and shift reactor effluent are at the discretion of the practitioner and are not limited to those disclosed in the specific embodiments above.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A gas conversion process which comprises producing a mixture of natural gas and sulfur-containing, $C_{4+}$ hydrocarbons from a gas well and separating said hydrocarbons from said natural gas which comprises hydrocarbon gas, forming a synthesis gas comprising a mixture of $H_2$ and CO from said hydrocarbon gas, synthesizing hydrocarbons by contacting a portion of said synthesis gas with a hydrocarbon synthesis catalyst and reacting said $H_2$ and CO in the presence of said catalyst at conditions effective to form hydrocarbons, at least a portion of which are upgraded by one or more hydroconversion operations, producing hydrogen from another portion of said synthesis gas and reacting said hydrogen with said sulfur-containing liquids in the presence of a hydrodesulfurization catalyst at reaction conditions effective to remove at least a portion of said sulfur as $H_2S$ and form desulfurized hydrocarbon liquid.

2. A process according to claim 1 wherein said hydrogen is produced from said synthesis gas by at least one of (i) physical separation means and (ii) chemical means.

3. A process according to claim 2 wherein said hydrogen is produced from said synthesis gas by means comprising physical separation.

4. A process according to claim 3 wherein said hydrogen production means includes a water gas shift reaction.

5. A process according to claim 2 wherein said hydrocarbons are synthesized by reacting said $H_2$ and CO mixture in the presence of a Fischer-Tropsch type of hydrocarbon synthesis catalyst at reaction conditions effective to form hydrocarbons, at least a portion of which are solid at standard room temperature conditions of temperature and pressure.

6. A process according to claim 5 wherein said hydrocarbon synthesis comprises a catalytic cobalt component.

7. A process according to claim 6 wherein said hydrocarbon synthesis reaction occurs in a slurry comprising said hydrocarbon synthesis catalyst and bubbles of said $H_2$ and CO in a slurry liquid which comprises said synthesized hydrocarbons which are liquid at said reaction conditions.

8. A process according to claim 1 wherein at least a portion of said hydrogen produced from said synthesis gas is used for one or more of (i) said upgrading hydroconversion operations, (ii) hydrocarbon synthesis catalyst rejuvenation and (iii) said hydrocarbon synthesis.

9. A process according to claim 1 wherein said hydroconversion produces a hydrogen-containing tail gas which is used for one or more of (i) hydrocarbon synthesis catalyst rejuvenation, (ii) said hydrogen production and (iii) said hydrocarbon synthesis.

10. A process according to claim 2 wherein said hydrogen production produces a CO rich offgas, which is used for one or more of hydrocarbon synthesis and fuel.

11. A gas conversion process which comprises
(a) removing a mixture comprising a hydrocarbon gas and sulfur containing $C_{4+}$ hydrocarbons from a natural gas well;
(b) separating at least a portion of said sulfur containing $C_{4+}$ hydrocarbons from said mixture;
(c) reacting said separated gas with oxygen and steam to form a synthesis gas comprising a mixture of $H_2$ and CO;
(d) contacting a portion of said synthesis gas with a hydrocarbon synthesis catalyst and reacting said $H_2$ and CO at reaction conditions effective to form hydrocarbons, at least a portion of which are upgraded by one or more conversion operations;
(e) producing hydrogen from another portion of said synthesis gas, and
(f) reacting said hydrogen with said sulfur containing $C_{4+}$ hydrocarbons in the presence of a hydrodesulfurization catalyst at reaction conditions effective to remove at least a portion of said sulfur as $H_2S$ and form desulfurized $C_{4+}$ hydrocarbon liquid.

12. A process according to claim 11 wherein said hydrogen is produced from said synthesis gas by at least one of (i) separation means and (ii) chemical means.

13. A process according to claim 12 wherein at least a portion of said synthesized hydrocarbons are reacted with hydrogen in a hydroconversion zone at reaction conditions effective to alter the molecular structure of at least a portion of said hydrocarbons being hydroconverted.

14. A process according to claim 13 wherein said hydrocarbon synthesis catalyst reversibly deactivates during said synthesis and wherein a portion of said hydrogen produced from said synthesis gas is also used for at least one of (i) rejuvenation of said catalyst and (ii) said hydroconversion.

15. A process according to claim 12 wherein said hydrogen is obtained by physically separating it from said synthesis gas which also produces an offgas comprising $H_2$ and CO in which the $H_2$ content is less than that in said synthesis gas.

16. A process according to claim 13 wherein a hydrogen rich tail gas is produced from said hydroconversion reaction.

17. A process according to claim 16 wherein at least a portion of said tail gas is used to supply hydrogen for said hydroconversion reaction.

18. A process according to claim 16 wherein a portion of said tail gas is used for at least one of (i) hydrocarbon synthesis catalyst rejuvenation, (ii) part of said synthesis gas feed for said hydrocarbon synthesis reaction, and (iii) the feed to said hydrogen production.

19. A process according to claim 12 wherein said chemical means comprises a water gas shift reaction.

20. A process according to claim 2 wherein said separation means comprises at least one of (i) pressure swing absorption and (ii) thermal swing absorption.

21. A process according to claim 12 wherein said separation means comprises at least one of (i) pressure swing absorption and (ii) thermal swing absorption.

* * * * *